US010781949B2

(12) United States Patent
Nordemo (10) Patent No.: US 10,781,949 B2
(45) Date of Patent: Sep. 22, 2020

(54) PIPE CONNECTOR AND A PIPE CONNECTOR UNIT

(71) Applicant: Xylem IP Management S.à r.l., Senningerberg (LU)

(72) Inventor: Stefan Nordemo, Stockholm (SE)

(73) Assignee: Xylem IP Management S.á r.l., Senningerberg (LU)

( * ) Notice: Subject to any disclaimer, the term of this patent is extended or adjusted under 35 U.S.C. 154(b) by 297 days.

(21) Appl. No.: 15/778,760

(22) PCT Filed: Nov. 24, 2016

(86) PCT No.: PCT/EP2016/078621
§ 371 (c)(1),
(2) Date: May 24, 2018

(87) PCT Pub. No.: WO2017/093104
PCT Pub. Date: Jun. 8, 2017

(65) Prior Publication Data
US 2018/0356017 A1 Dec. 13, 2018

(30) Foreign Application Priority Data
Nov. 30, 2015 (EP) .................................... 15197068

(51) Int. Cl.
*F16L 23/00* (2006.01)
*F16L 23/036* (2006.01)
(Continued)

(52) U.S. Cl.
CPC ........ *F16L 23/003* (2013.01); *F04D 29/4293* (2013.01); *F04D 29/605* (2013.01);
(Continued)

(58) Field of Classification Search
CPC ..... F16L 23/003; F16L 23/006; F16L 23/036; F16L 25/12; F16L 23/00; F04D 29/4293;
(Continued)

(56) References Cited

U.S. PATENT DOCUMENTS 1,332,769 A * 3/1920 Souter ................... F16L 23/036
285/364
3,415,285 A * 12/1968 Odvar ................... F16L 23/006
138/94.3
(Continued)

FOREIGN PATENT DOCUMENTS

DE 594994 C * 6/1932
DE 805470 C * 5/1951
(Continued)

OTHER PUBLICATIONS

International Preliminary Report on Patentability for Application No. PCT/EP2016/ 078621, dated Nov. 28, 2017, 29 pages.
(Continued)

*Primary Examiner* — James M Hewitt, II
(74) *Attorney, Agent, or Firm* — RatnerPrestia (57) ABSTRACT

A pipe connector for connecting a first element to a second element. The pipe connector includes a pipe segment, a first flange located at a first end of the pipe segment and configured to be connected to the first element, and a second flange located at a second end of the pipe segment and configured to be connected to the second element. The first flange includes a circumferential anchor flange that is fixedly connected to the pipe segment at the first end. A flange insert is displaceable in the axial direction of the pipe connector in relation to the anchor flange between a retracted position and an extended position, and a mechanism for displacing the flange insert in relation to the anchor
(Continued)

flange. The flange insert in the extended position protrudes in the axial direction in relation to the anchor flange.

16 Claims, 10 Drawing Sheets

(51) Int. Cl.
*F16L 25/12* (2006.01)
*F04D 29/42* (2006.01)
*F04D 29/60* (2006.01)

(52) U.S. Cl.
CPC ........... *F16L 23/006* (2013.01); *F16L 23/036* (2013.01); *F16L 25/12* (2013.01); *F05D 2230/70* (2013.01); *F05D 2230/72* (2013.01)

(58) Field of Classification Search
CPC . F04D 29/605; F05D 2230/72; F05D 2230/70
See application file for complete search history.

(56) References Cited

U.S. PATENT DOCUMENTS

| | | |
|---|---|---|
| 3,627,357 A | 12/1971 | Sanders |
| 8,844,977 B2 | 9/2014 | Södergärd |
| 2011/0101671 A1 | 5/2011 | Dixon |

FOREIGN PATENT DOCUMENTS

| | | | | |
|---|---|---|---|---|
| DE | 1866132 U | | 1/1963 | |
| DE | 1146317 B | * | 3/1963 | |
| DE | 1185430 B | * | 1/1965 | |
| DE | 1915755 U | | 5/1965 | |
| DE | 2338447 A1 | * | 2/1975 | ............ F16L 23/02 |
| FR | 1535637 A | * | 7/1968 | |
| FR | 2044909 A5 | * | 2/1971 | |
| FR | 2591308 A1 | * | 6/1987 | ............ F16L 23/006 |

OTHER PUBLICATIONS

International Search Report and Written Opinion for International Application No. PCT/EP2016/078621, dated Jan. 25, 2017, 9 pages.

* cited by examiner

PIPE CONNECTOR AND A PIPE CONNECTOR UNIT

CROSS-REFERENCE TO RELATED APPLICATIONS

This patent application is a U.S. National Phase Patent Application of PCT Application No.: PCT/EP2016/078621, filed Nov. 24, 2016, which claims priority to European Patent Application No. 15197068.8, filed Nov. 30, 2015, each of which is incorporated by reference herein in its entirety.

TECHNICAL FIELD OF THE INVENTION

The present invention relates generally to the field of apparatuses for connecting different elements in a pipeline system. Further, the present invention relates specifically to the field of pipeline systems for pump applications, configured for pumping waste water or sewage water that may contain solid matter.

According to a first aspect the invention relates to a pipe connector for connecting a first element to a second element, wherein the pipe connector comprises a pipe segment having a first end and a second end, a first flange located at the first end of the pipe segment and configured to be connected to said first element and a second flange located at the second end of the pipe segment and configured to be connected to said second element.

According to a second aspect the invention relates to a pipe connector unit for connecting the second element to a pipeline system, wherein the pipe connector unit comprises the above pipe connector.

BACKGROUND OF THE INVENTION

The pump applications that the present invention is principally intended for, comprises a dry installed centrifugal pump and a suction pipe extending from a water tank to the centrifugal pump. Thus, the present invention originates from such an application and is specifically advantageous in such applications, but it shall be realized that the present invention is not delimited to be used in such applications only.

The term dry installed centrifugal pump refers to pump installations in which the pump is not lowered into the liquid/water that the pump is arranged to pump. Instead the centrifugal pump is arranged on the outside of the water tank, usually at the same level as the bottom of the water tank. Furthermore, such a pump application requires a suction pipe extending from the water tank to the inlet of the centrifugal pump.

In pump applications where the centrifugal pump is lowered into the liquid that shall be pumped, there is usually not a problem to clean or inspect the inlet opening of the pump. The pump is simply hoisted from the tank, and either the inlet opening is cleaned automatically upon hoisting due to gravity or the inlet opening is cleaned manually when the pump is lifted out of the water tank by flushing it with water or manually removing the solid matter. In centrifugal pumps having a so-called open impeller, when the pump is lifted out of the water tank, it is also easy to inspect and in some installations adjust the gap provided between the lower edge of the vane of the impeller and the impeller seat of the pump. Inspection and adjustment of this gap must be performed at recurrent interval due to natural wear of the vane of the impeller, usually at least twice a year. When the gap increases due to wear of the impeller, the pump performance will deteriorate.

In pump applications where the centrifugal pump is dry installed, the inlet flange of the pump is bolted to a suction connection and in some applications the pump is supported by the suction connection and thereto a pressure pipe is bolted to the outlet flange of the pump. The diameter of the pump inlet is typically in the range 300-1000 millimeters, and the pump can weigh several tons. In other words, the hydraulic unit of the pump is very cumbersome to detach. Thereto the suction connection is bolted to a suction pipe that in its other end is connected to the water tank. The suction pipe is in almost all applications a conduit that comprises a maneuverable shut off valve that in its closed state prevents the liquid in the water tank to flow out when the pump is removed. Thus, the pipeline system has rigid anchorage points.

According to one known way of inspecting the gap and cleaning the inlet opening of the pump and the impeller, the drive unit of the pump together with the impeller that is suspended by the drive shaft, have to be removed from the hydraulic unit of the pump. This is done by having straps or the like attached to the drive unit and thereafter a great number of bolts joining the drive unit and the hydraulic unit of the pump are removed. Thereafter the drive unit is moved horizontally away from the hydraulic unit in order to expose the impeller. Upon adjustment of the abovementioned gap between the lower edge of the vane of the impeller and the impeller seat of the pump, so-called trimming of the impeller, the impeller is displaced in the axial direction of the drive shaft of the drive unit in the direction away from the drive unit, and/or the impeller seat is displaced in the direction towards the drive unit. This displacement is made with interest such that upon fitting in and reassemble of the drive unit the vane of the impeller abuts the impeller seat. Thereafter the maintenance staff measure the obtained distance at the abutment interface between the drive unit and the hydraulic unit, whereupon the drive unit once more is lifted away from the hydraulic unit and the impeller is displaced in the axial direction along the drive shaft in the direction towards the drive unit the measured distance plus the predetermined height of the gap. Finally fitting in and reassembly of the drive unit takes place and then the maintenance staff may only inspect that the impeller runs freely and that the real abutment surfaces abut each other, and in other respects the maintenance staff has to rely on that the measuring and the trimming have been made in a satisfactory way. It shall be pointed out that a difference of the height of the gap by millimeters will affect the performance of the pump.

Another known way of gaining access to the inlet opening of the pump is disclosed in the applicants own U.S. Pat. No. 8,844,977. In this document is shown an arrangement that comprises a first pipe socket that is telescopically displaceable in the axial direction in relation to a second pipe socket, between an operative position and a service position. In the service position the first pipe socket is located at a distance from the pump and thereby admits access to the inlet opening of the pump. This arrangement is especially advantageous in applications where the pump has an inlet opening diameter less than about 350 millimeter. In applications where the pump has an inlet opening diameter bigger than about 300 millimeters, the first pipe socket becomes heavy and cumbersome to manipulate.

In U.S. Pat. No. 3,627,357 is disclosed a pipe connector fitting configured to replace pipe sections in a rigidly anchored pipeline system without disturbing the anchor points of the pipe line.

OBJECT OF THE INVENTION

The present invention aims at obviating the aforementioned disadvantages and failings of previously known pipe connectors, and at providing an improved pipe connector. A primary object of the present invention is to provide an improved pipe connector of the initially defined type which is easy to install and remove in a pipeline system that is rigidly anchored.

It is another object of the present invention to provide a pipe connector, which renders it possible to inspect and clean the inlet opening of a centrifugal pump and/or an impeller without having to remove the drive unit from the hydraulic unit.

It is another object of the present invention to provide a pipe connector, which admit trimming of the impeller without having the drive unit removed from the hydraulic unit.

SUMMARY OF THE INVENTION

According to the invention at least the primary object is attained by means of the initially defined pipe connector and pipe connector unit having the features defined in the independent claims. Preferred embodiments of the present invention are further defined in the dependent claims.

According to a first aspect of the present invention, there is provided a pipe connector of the initially defined type, which is characterized in that the first flange of the pipe connector comprises a circumferential anchor flange that is fixed connected to the pipe segment at said first end, a flange insert that is displaceable in the axial direction of the pipe connector in relation to the anchor flange between a retracted position and an extended position, and means for displacing the flange insert in relation to the anchor flange, in the direction running axial from the second end towards the first end of the pipe segment, wherein the flange insert in the extended position protrude in the axial direction in relation to said anchor flange.

According to a second aspect of the present invention, there is provided a pipe connector unit which an inventive pipe connector and an adaptor, wherein the adaptor comprises a pipe segment having a first end configured to be connected to said pipe system and a second end, and a flange located at the second end of the pipe segment and connected to the first flange of the pipe connector.

Thus, the present invention is based on the insight that if the axial length of the pipe connector can be increased/decreased due to telescopic displacement, even in applications having large diameters, it will allow easy installation/removal of the pipe connector in a pipeline system having rigid anchor points.

In a preferred embodiment of the present invention, the means for displacing the flange insert comprises at least three individual pushers. The pushers are distributed along the circumferential direction and secure that the flange insert is not tilted/wedged.

According to a preferred embodiment, the first flange of the pipe connector comprises at least one circumferential gasket, which is configured to be located between the first element and the flange insert. Preferably said at least one gasket is configured to be located between the first element, the flange insert and the anchor flange. Thereby a liquid tight interface is secured.

Further advantages with and features of the invention will be apparent from the other dependent claims as well as from the following detailed description of preferred embodiments.

Further Elucidation of Prior Art

Document DE 1915755 discloses a pipe connector for connecting a first 3 pipe and a second pipe. The pipe connector comprises a pipe segment having a right end and a left end, a first flange located at the right end of the pipe segment and configured to be connected to said first pipe via a threaded pin, a second flange located at the left end of the pipe segment and configured to be connected to said second pipe, wherein the first flange is constituted by an anchor flange that is fixed connected to the pipe segment at said right end.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

The present invention relates to a pipe connector, generally designated 1, which will be described in connection with a pump installation. However, it shall be pointed out that the inventive pipe connector 1 is not delimited to be used in such applications only. The invention also relates to a pipe connector unit comprising such a pipe connector 1.

Figure 1:
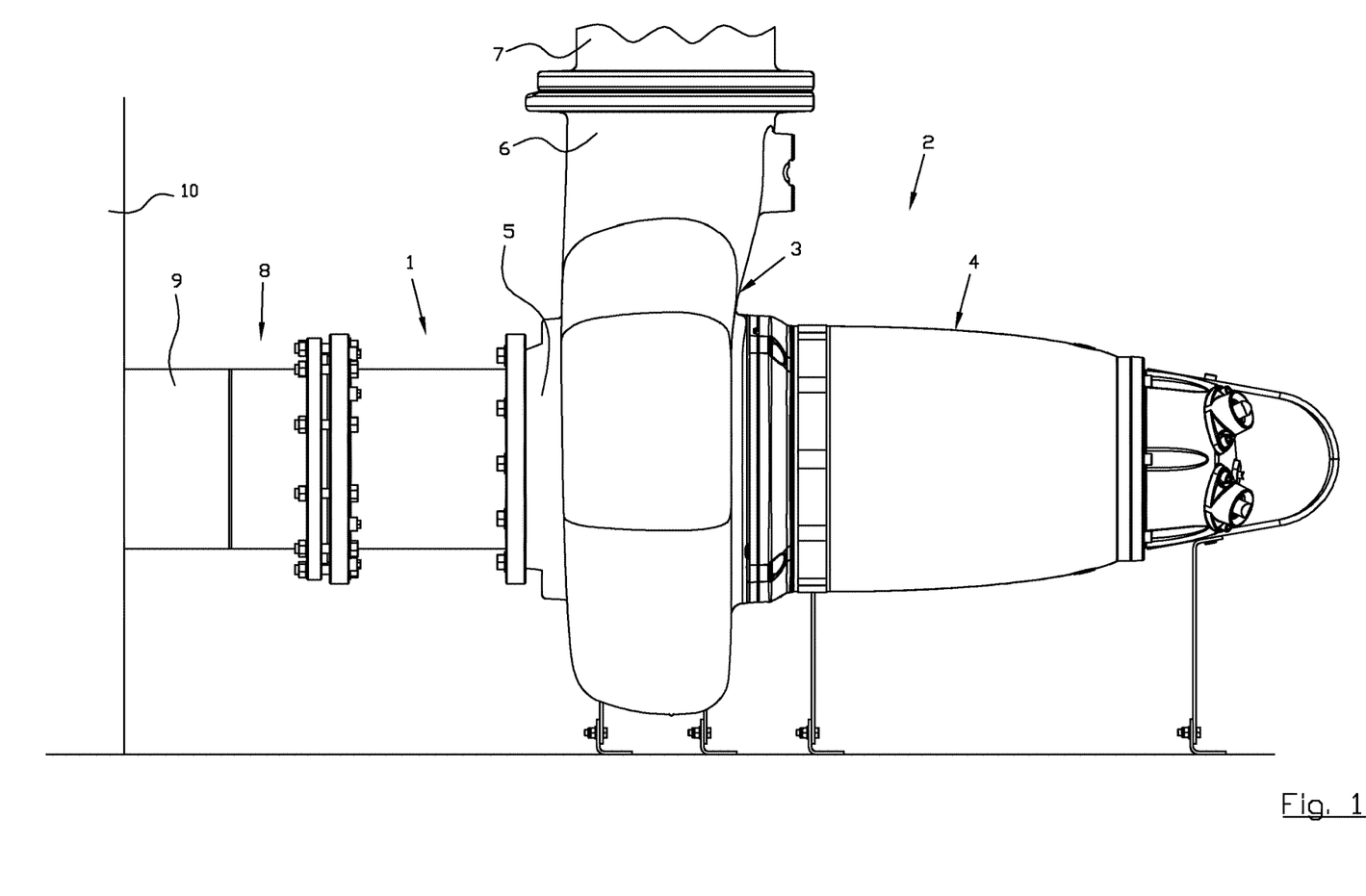
FIG. 1 is a schematic side view of the inventive pipe connector unit attached to a centrifugal pump arranged in Z-installation.

Reference is initially made to FIG. 1 disclosing a pump installation. FIG. 1 disclose a centrifugal pump 2, also known as a waste water pump or sewage pump, arranged in a so-called Z-installation, i.e. an axial center axis of the pump 2 extend in a horizontal direction. It shall be pointed out that the orientation of the pump 2 is not limited to the disclosed orientation but other orientations are also included, for instance Y-installation in which the axial center axis of the pump 2 extend in a vertical direction. The pump 2 and the inventive pipe connector 1 are dry installed in the disclosed configuration, i.e. not submerged in the pumped liquid. However, it shall be realized that the pump 2 as well as the inventive pipe connector 1 may be partly or entirely submerged in the pumped liquid or in another liquid.

The centrifugal pump 2 comprises a hydraulic unit 3 and a drive unit 4. The hydraulic unit 3 is that part of the pump 2 in which the actual pumping takes place and in which the impeller (not shown) of the pump 2 is located. The drive unit 4 is that part of the pump 2 that comprises a motor, other operation equipment such as a VFD (not shown) and a drive shaft from which the impeller is suspended. The hydraulic unit 3 of the pump 2 comprises an inlet 5 and an outlet 6. The outlet 6 is direct or indirect connected to a pressure pipe 7, also known as outlet pipe. Each of the hydraulic unit 3 and the drive unit 4 is bolted to the ground and/or supported by a cradle/carriage. The hydraulic unit 3 and the drive unit 4 may be disconnected from each other, and separated in order to perform extensive service/maintenance, trimming, etc. The inner diameter of the inlet 5 of the pump 2 is typically in the range 300-1000 millimeters.

FIG. 1 also discloses an adaptor, generally designated 8, connected to the pipe connector 1 and connected to a suction pipe 9, also known as inlet pipe. In the disclosed embodiment the adaptor 8 is welded to the suction pipe 9. The suction pipe 9 is connected to a tank 10, from which the pump 2 is intended to pump liquid. The disclosed suction pipe 9 also represents any other feasible element of a pipe system, such as a pipe section, a pipe socket, a non-return valve, a pump, etc.

The combination of the pipe connector 1 and the adaptor 8 creates an inventive pipe connector unit. The inventive pipe connector 1, alone or together with the adaptor 8, may be arranged in any other suitable location in a pipe system, such as at the outlet 6 of the pump 2, next to a shut-off/check valve, attached to the tank 10, between two pipe sections in a pipe line, be used as a replacement part to repair a leaking pipe line, a combination thereof, etc. Thus, the inventive pipe connector 1 and the inventive pipe connector unit are not limited to the disclosed pump installation.

The most essential advantage of the present invention is that the axial length of the pipe connector 1 may be increased/decrease by way of telescopic displacement such that the pipe connector 1 may be installed to and removed from a pipe system that is rigidly anchored, without the need to bend apart the adjoining elements using heavy duty hydraulic tools.

Figure 2:
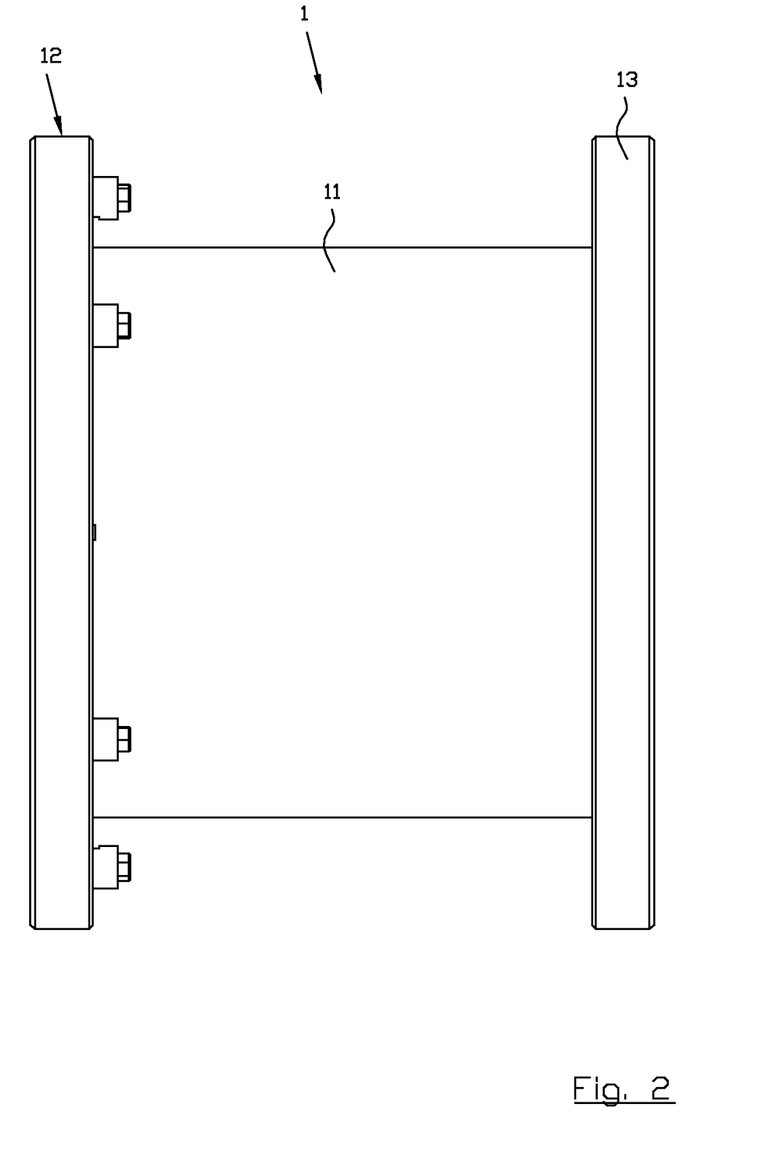
FIG. 2 is a schematic side view of the inventive pipe connector according to a preferred embodiment.
Figure 3:
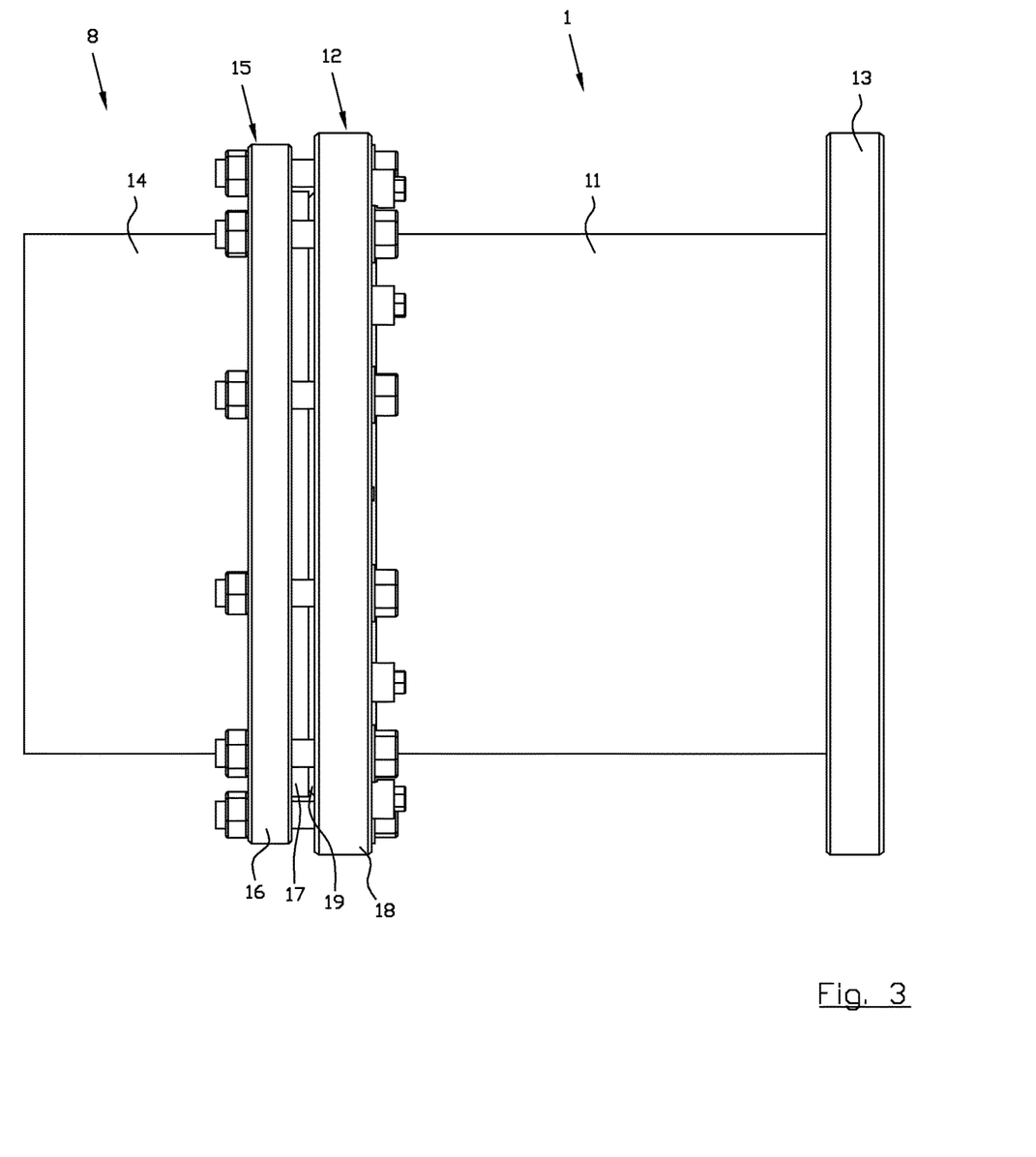
FIG. 3 is a schematic side view of the inventive pipe connector unit according to a preferred embodiment.

Reference is now also made to FIGS. 2 and 3. FIG. 2 disclose a preferred embodiment of the inventive pipe connector 1, and FIG. 3 disclose a preferred embodiment of the inventive pipe connector unit.

The pipe connector 1 (see FIG. 2) is arranged for connecting a first element to a second element. The second element may be constituted by the centrifugal pump 2, a valve, a pipe line, a pipe section, a pipe socket, a non-return valve, etc. The first element may be constituted by the adaptor 8, a suction pipe 9, a pressure pipe 7, a pipe section, a pipe socket, a pump, etc.

The pipe connector 1 comprises a pipe segment 11, a first flange, generally designated 12, and a second flange 13.

The pipe segment 11 presents a first end and a second end. In the disclosed embodiment the first end and the second end are opposite each other and of the same size. However, in alternative embodiments the diameter of the pipe segment 11 may vary along the length of the pipe segment 11 and/or the pipe segment 11 may be bent. The inner diameter of the pipe segment 11 is preferably equal to or more than 300 millimeters, preferably more than 500 millimeters. The inner diameter of the pipe segment 11 is preferably equal to or less than 1000 millimeters. The axial length of pipe connector 1 in relation to the inner and/or outer diameter of the pipe segment 11 is preferably determined by the present standard for valves for pipe lines, thereby the pipe connector 1 may replace a valve when service is performed on the valve. A pipe connector 1 arranged next to a valve allow for easy replacement of the valve. In an alternative embodiment the pipe segment 11 of the pipe connector 1 may itself comprise a shut-off or check valve.

The first flange 12 is located at the first end of the pipe segment 11 and is configured to be connected to said first element. The first flange 12 will be described in more detail below.

The second flange 13 is located at the second end of the pipe segment 11 and is configured to be connected to said second element. The second flange 13 may be constituted by a fixed flange or by a loose flange. When using a loose flange, the loose flange is thread on to the pipe segment 11 and then a flange ring or welding collar is fixed connected to the pipe segment 11 at the second end. In an alternative embodiment the second flange 13 is constituted by "a first flange 12".

The pipe connector unit (see FIG. 3) is arranged for connecting the second element to a pipe system. The pipe system may be constituted by a cut-off pipe line, the wall of a tank 10, a pipe line having a flange, a suction pipe 9, a pressure pipe 7, etc.

The pipe connector unit comprises a pipe connector 1 and an adaptor 8, wherein the adaptor 8 comprises a pipe segment 14 and a flange, generally designated 15.

The pipe segment 14 of the adaptor 8 presents a first end that is configured to be connected to the pipe system and a second end. In the disclosed embodiment the first end of the pipe segment 14 is configured to be welded to the pipe system. In the disclosed embodiment the first end and the second end are opposite each other and of the same size. However, in alternative embodiments the diameter of the pipe segment 14 may vary along the length of the pipe segment 14 and/or the pipe segment 14 may be bent.

The flange 15 of the adaptor 8 is located at the second end of the pipe segment 14 and is connected to the first flange 12 of the pipe connector 1. The flange 15 of the adaptor 8 may be constituted by a fixed flange or by a loose flange arrangement, the latter being disclosed in the figures. When using a loose flange 16, the loose flange 16 is thread on to the pipe segment 14 and then a flange ring 17 or welding collar is fixed connected to the pipe segment 14 at the second end.

The pipe connector unit is preferably used when a new pump 2 shall replace an old pump in an existing pipe system, or in pump installations where inspection of the pump inlet shall be possible without demounting the pump 2. In replacement situations the existing pipe system is rigidly anchored and usually has incorrect flange pattern and incorrect location of the flange in relation to the new pump 2. Thus, the existing pipe line is cut-off at a distance from the location of the inlet flange of the new pump 2 that is equal to the length of the pipe connector unit. Then the adaptor 8 is welded to the existing pipe line and the new pump 2 is installed and connected to the pipe connector 1.

Figure 4:
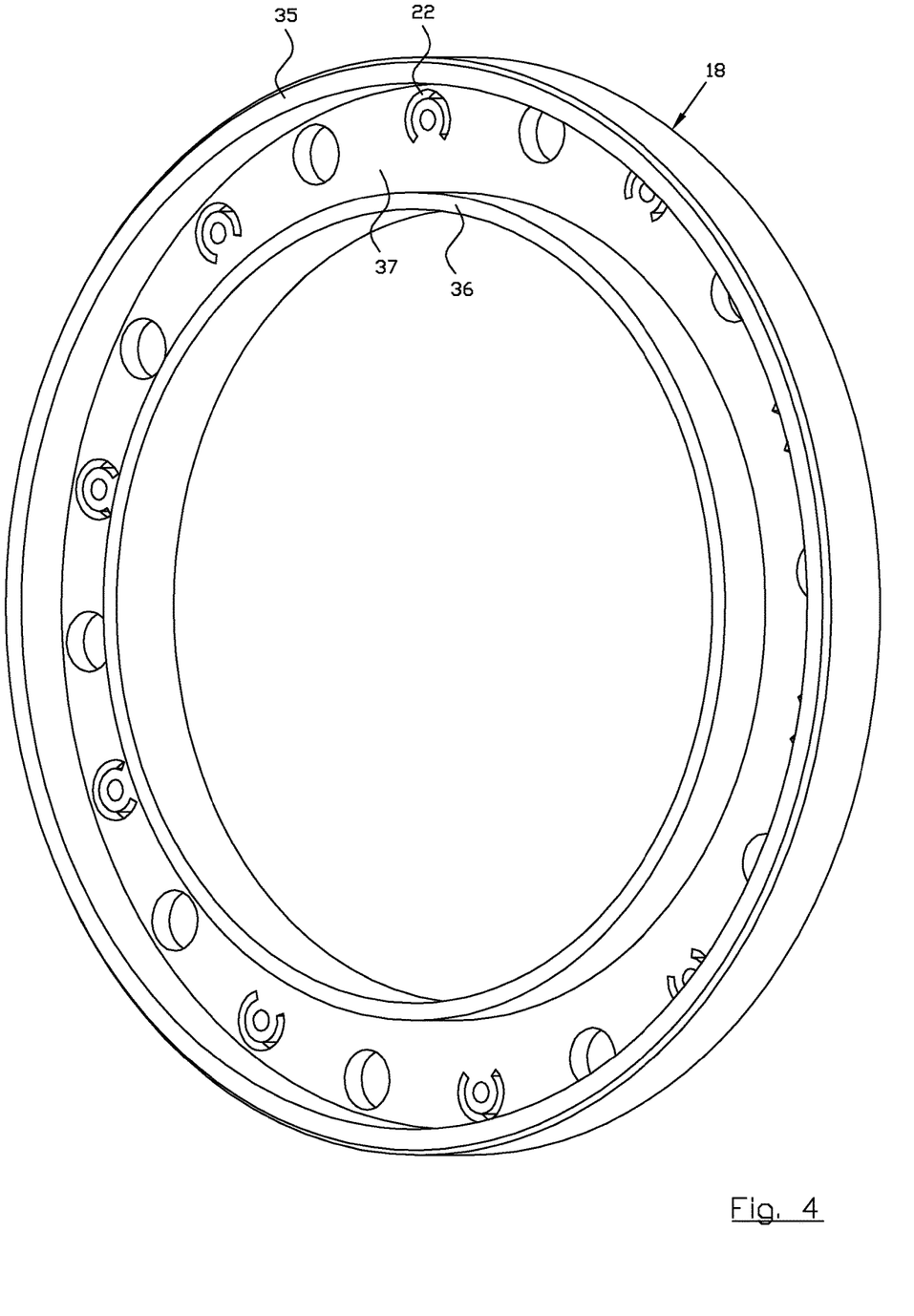
FIG. 4 is a schematic perspective view of the anchor flange of the first flange of the pipe connector.
Figure 5:
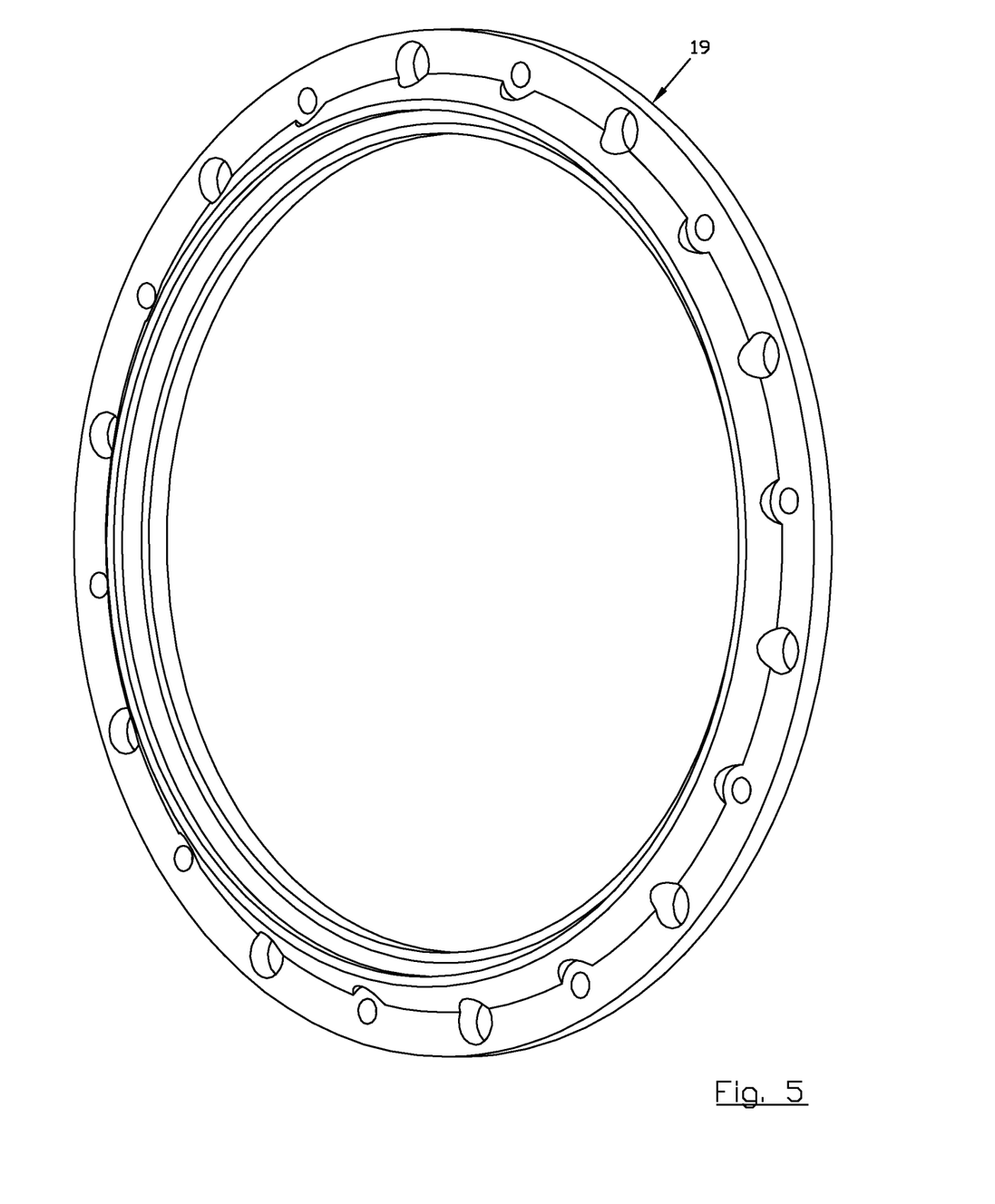
FIG. 5 is a schematic perspective view of the flange insert of the first flange of the pipe connector.

Reference is now also made to FIGS. 4 and 5, showing the main components of the first flange 12 of the pipe connector 1.

The first flange 12 of the pipe connector 1 comprises a circumferential anchor flange 18 and a flange insert 19.

The anchor flange 18, or fixed flange part, disclosed in FIG. 4 is configured to be fixed connected to the pipe segment 11 at the first end thereof. The anchor flange 18 is preferably welded to the pipe segment 11, either at the end of the pipe segment 11 or outwardly of the pipe segment 11. As a complement the anchor flange 18 may also be in press fit engagement with the pipe segment 11. The interface between the anchor flange 18 and the pipe segment 11 is liquid tight. Preferably the anchor flange 18 protrudes in the axial direction in relation to the pipe segment 11 of the pipe connector 1. In an alternative embodiment the anchor flange 18 and the pipe segment 11 may be located in flush with each other.

It is essential for the present invention that the flange insert 19 is displaceable in the axial direction of the pipe connector 1 in relation to the anchor flange 18 between a retracted position and an extended position. In the extended position the flange insert 19 protrudes in the axial direction in relation to the anchor flange 18, and in the retracted position the flange insert 19 does not protrude in the axial direction in relation o the anchor flange 18. Preferably the flange insert 19 is circumferential, but can be constituted by a plurality of arc-shaped segments.

Figure 6:
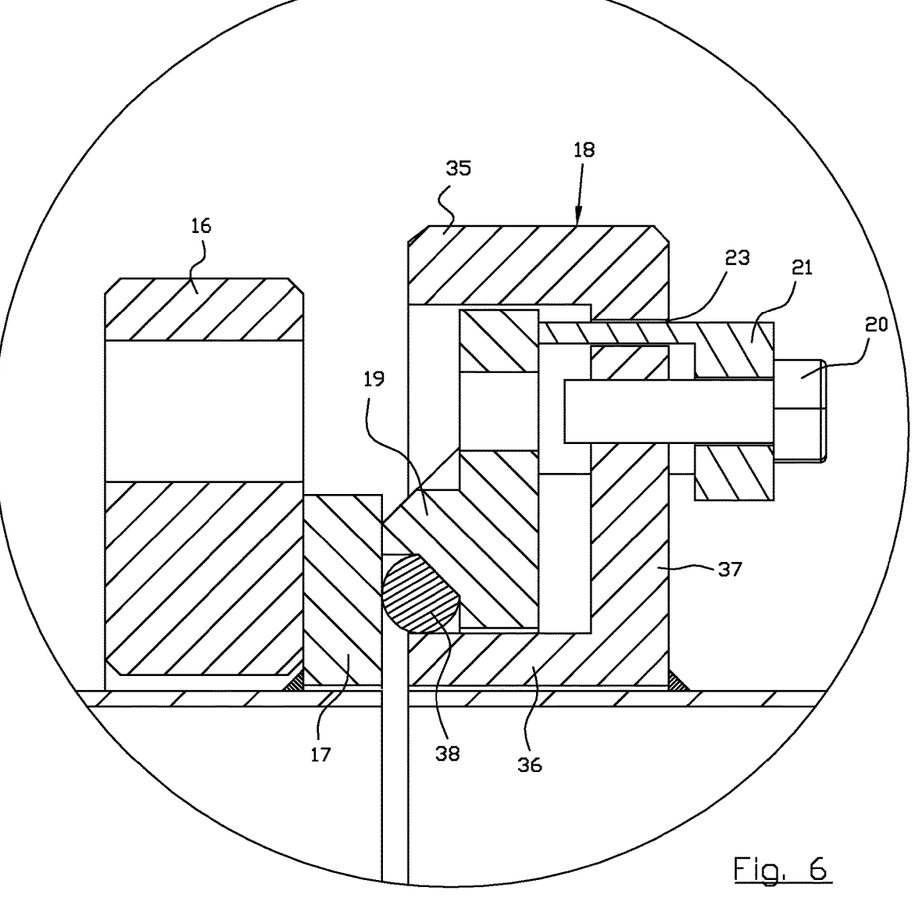
FIG. 6 is an enlarged cross sectional side view taken at a first cross section of a portion of the interface between the pipe connector and the adaptor.
Figure 7:
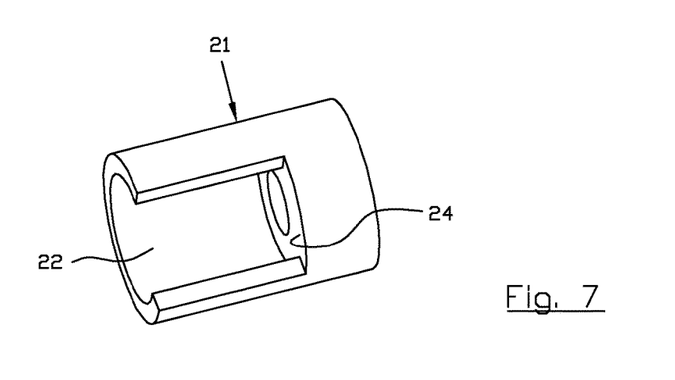
FIG. 7 is a schematic perspective view of a sleeve that is part of the displacement means of the pipe connector.
Figure 8:
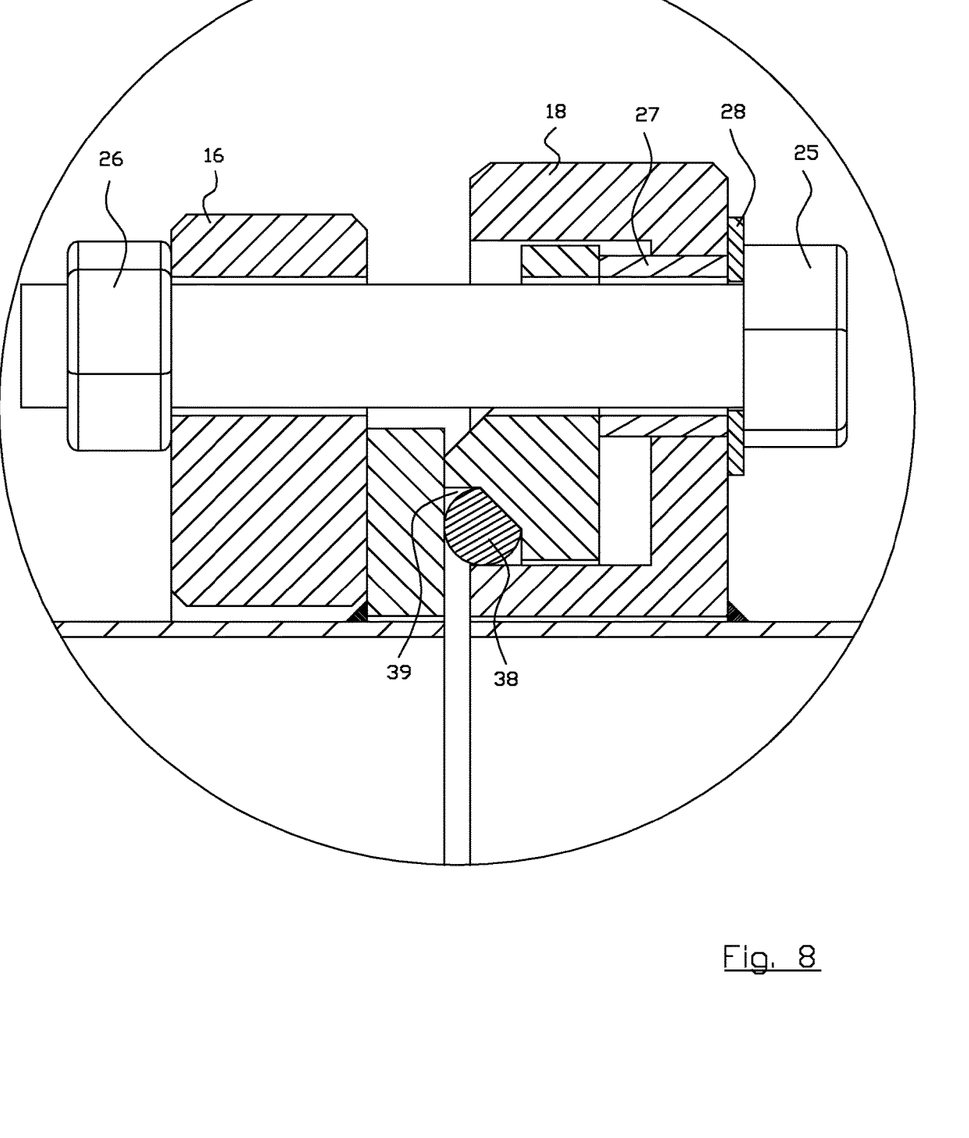
FIG. 8 is an enlarged cross sectional side view taken at a second cross section of a portion of the interface between the pipe connector and the adaptor.

Reference is now also made to FIGS. 6, 7 and 8, wherein FIGS. 6 and 8 are cross sectional side views taken at a first cross section and a second cross section, respectively, of a portion of the interface between the pipe connector 1 and the adaptor 8. FIGS. 6 and 8 disclose the first flange 12 of the pipe connector 1 and the flange 15 of the adaptor 8 in more detail.

The first flange 12 of the pipe connector 1, besides the anchor flange 18 and the flange insert 19, comprises means for displacing the flange insert 19 in relation to the anchor flange 18, in the direction running axially from the second end towards the first end of the pipe segment 11 of the pipe connector 1. The means for displacing the flange insert 19 is located at the first cross section, disclosed in FIG. 6.

Said means for displacing/moving the flange insert 19 preferably comprises at least three individual pushers, however, in reality the number of pushers is about nine or more. Said pushers are distributed along the circumferential direction of the anchor flange 18 and only one is shown. When the pushers are manipulated in a positive direction the flange insert 19 is displaced from the retracted position towards the extended position.

According to a preferred embodiment each pusher comprises a screw 20 that is in threaded engagement with the anchor flange 18, wherein the screw 20 is configured to displace the flange insert 19 from the retracted position towards the extended position when the screw 20 is manipulated in the positive direction/tightened. According to the one embodiment (not disclosed) the free end of the screw 20 abuts the flange insert 19.

According to the preferred embodiment disclosed in FIGS. 6 and 7, the pusher furthermore comprises a sleeve 21, wherein the screw 20 indirectly act upon the flange insert 19 via said sleeve 21. In the disclosed embodiment the sleeve 21 comprises a longitudinal slit 22, and the sleeve 21 extends through an arc-shaped slit 23 in the anchor flange 18 and a free end of the sleeve 21 abuts and acts upon the flange insert 19. In an alternative embodiment, the sleeve 21 is fixed connected to the flange insert 19. Thus, the underside of the head of the screw 20 abut the sleeve 21 and when the screw 20 is tightened the sleeve 21 is displaced in relation to the anchor flange 18 and displaces the flange insert 19. According to the disclosed embodiment the sleeve 21 has a stop surface 24, which prevents further tightening of the screw 20 and thereby prevents excessive displacement of the flange insert 19. A washer can be arranged between the screw 20 and the sleeve 21.

The pipe connector unit comprises means for clamping the first flange 12 of the pipe connector 1 and the flange 15 of the adaptor 8. In the preferred embodiment disclosed in FIG. 8 the clamping means comprises a bolt 25 and nut 26, however, it shall be pointed out that other clamping means are conceivable. The clamping means determine the maximum axial distance between the flange 15 of the adaptor 8 and the anchor flange 18 of the first flange 12 of the pipe connector 1. Said clamping means preferably comprises at least three sets of bolt and nut, however, in reality the number of clamping means is about nine or more. Said clamping means are distributed along the circumferential direction of the anchor flange 18 and only one is shown.

In the disclosed embodiment the clamping means also comprises a spacer 27. The object of the spacer 27 is to determine/define the minimum axial distance between the flange 15 of the adaptor 8 and the anchor flange 18 of the first flange 12 of the pipe connector 1. The spacer 27 is arranged between the flange insert 19 and the head of the bolt 25, and extends through the anchor flange 18. The spacer 27 can be fixed connected to the flange insert 19 or be fixed connected to, or part of, the bolt 25. In the disclosed embodiment the spacer 27 is thread on to the bolt 25. When the bolt 25 and nut 26 are tightened, the spacer 27 is clamped between the bolt 25 and the flange insert 19, the flange insert 19 is clamped between the spacer 27 and the flange 15 of the adaptor 8, and the flange 15 of the adaptor 8 is clamped between the flange insert 19 and the nut 26. In the disclosed embodiment the axial length of the spacer 27 is such that said minimum axial distance is equal to said maximum axial distance, i.e. the head of the bolt 25 abuts both the spacer 27 and the anchor flange 18.

In the disclosed embodiment, a washer 28 is located under the head of the bolt 25, wherein said washer 28 in this context is considered as part of the head of the bolt 25. A washer can also be arranged at the nut 26. It shall also be understood that the bolt 25 and nut 26 can have the opposite configuration, i.e. the head of the bolt 25 can be arranged to abut the flange 15 of the adaptor 8 and the nut 26 can be arranged to abut the anchor flange 18 of the first flange 12 of the pipe connector 1.

When mounting the preferred embodiment of the pipe connector unit, the clamping means is firmly tightened, i.e. the head of the bolt 25 act upon the spacer 27, the spacer 27 act upon the flange insert 19, the flange insert 19 act upon the flange 15 of the adaptor 8, the flange 15 of the adaptor 8 act upon the nut 26. At this stage, the location of the anchor flange 18 is not determined, i.e. the anchor flange 18 can be located abutting the flange 15 of the adaptor 8. Thus, the next step is to have the pusher firmly tightened. The screw 20 of the pusher is tightened and thereby the sleeve 21 displace the flange insert 19 in relation to the anchor flange 18 until the anchor flange 18 abut the head of the bolt 20.

Preferably the diameter of the screw 20 is less than the diameter of the bolt 25, preferably the diameter of the screw 20 is about 50% of the diameter of the bolt 25. Thereby, there is no risk that the bolt 25 is stretched due to the tightening of the screw 20.

Figure 9:
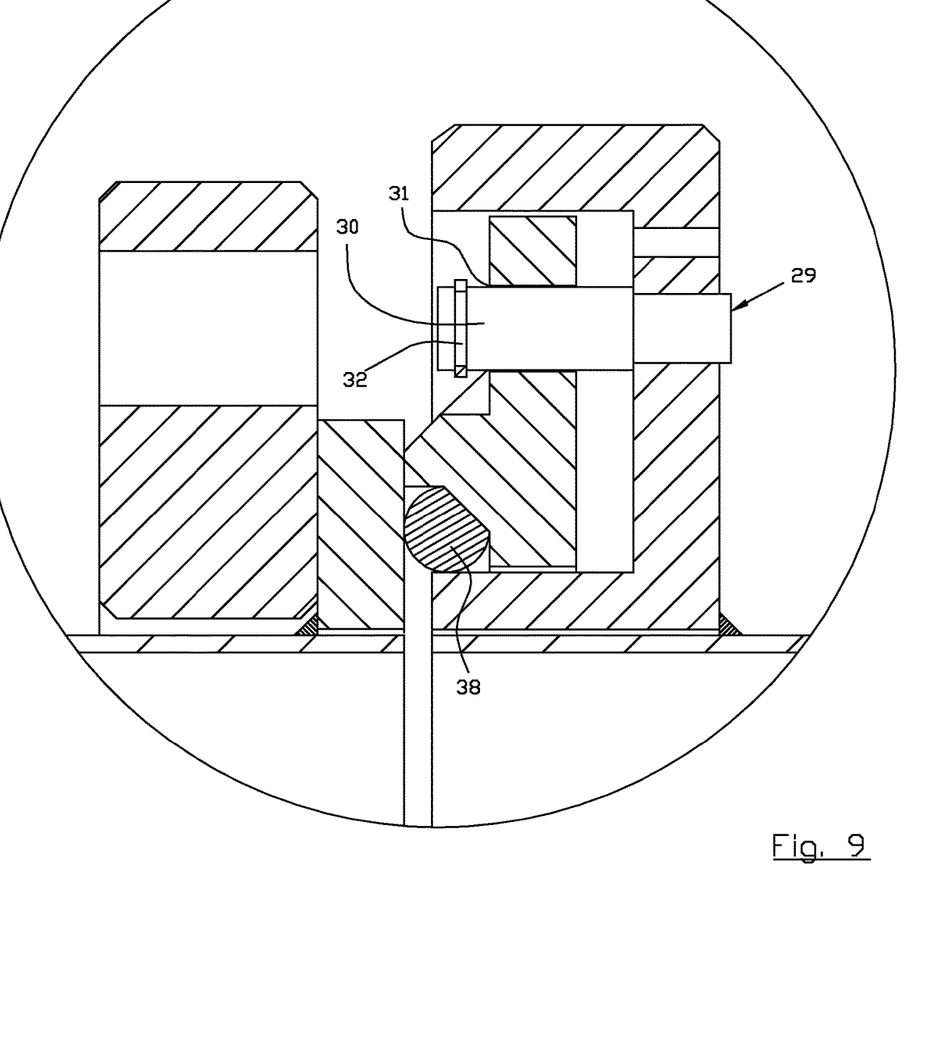
FIG. 9 is an enlarged cross sectional side view taken at a third cross section of a portion of the interface between the pipe connector and the adaptor.

Reference is now also made to FIG. 9, which is a cross sectional side view taken at a third cross section of a portion of the interface between the pipe connector 1 and the adaptor 8.

The first flange 12 of the pipe connector 1 preferably comprises at least one safety member 29 that is configured to limit the axial displacement of the flange insert 19 in relation to the anchor flange 18. Thus, the safety member 29 prevents the flange insert 19 to be unintentionally removed from the pipe connector 1. In the disclosed embodiment a pin 30 is connected to the anchor flange 18 and protrudes in the axial direction towards the adaptor 8. Preferably the pin 30 is in threaded engagement with the anchor flange 18. A through hole 31 of the flange insert 18 is thread on to the pin 30 whereupon a circlip 32 is added to the free end of the pin 30.

Figure 10:
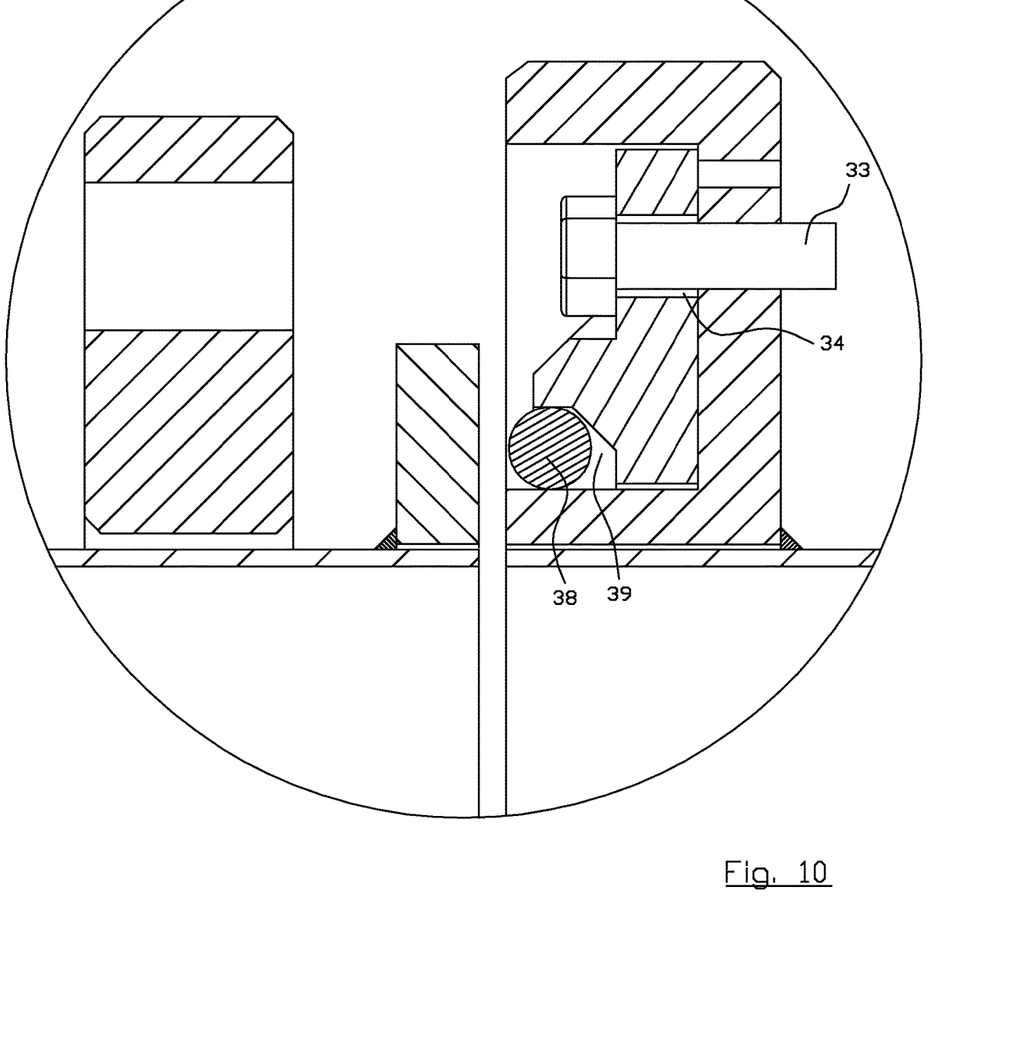
FIG. 10 is an enlarged cross sectional side view taken at the first cross section of a portion of the interface between the pipe connector and the adaptor, having the flange insert in the retracted position, and FIG. 11 corresponds to FIG. 7 and disclose and alternative embodiment of the first flange of the pipe connector.

Reference is now also made to FIG. 10, which is a cross sectional side view taken at the first cross section of a portion of the interface between the pipe connector 1 and the adaptor 8.

In order to remove the pipe connector 1, the clamping means is removed and the pusher is removed. Then the flange insert 19 is pushed in the axial direction towards the second end of the pipe segment 11 of the pipe connector 1, either by hand or by means of a suitable tool. In the disclosed embodiment a screw 33 is inserted into a through hole 34 in the flange insert 19 and in threaded engagement with the anchor flange 18. Upon tightening of the screw 33 the flange insert 19 is displaced in relation to the anchor flange 18, towards the second end of the pipe segment 11. In an alternative embodiment said screw 33, in an untightened state, can also replace the pin 30 as a safety member.

According to the preferred embodiment disclosed in the figures (see especially FIG. 4), the anchor flange 18 comprises an outer ring 35, an inner ring 36 and a radially extending web 37. The web 37 connects the outer ring 35 and the inner ring 36, the flange insert 19 being located between the outer ring 35 and the inner ring 36. In an alternative embodiment the anchor flange 18 is only constituted by said web 37, and in another alternative embodiment the anchor flange 18 is constituted by the inner ring 36 and the web 37.

According to a preferred embodiment the pipe connector unit comprises at least one circumferential gasket 38 that is located in the interface between the flange 15 of the adaptor 8 and the flange insert 19 of the first flange 12 of the pipe connector 1. The gasket is preferably an O-ring having circular cross section, and presents a diameter that is greater than twice the maximum axial distance between the anchor flange 18 and the flange 15 of the adaptor 8. Preferably, said at least one circumferential gasket 38 is part of the first flange 12 of the pipe connector 1. In the disclosed embodiment the at least one gasket 38 is located in a seat/recess 39 in the flange insert 19. In the preferred embodiment said at least one gasket 38 is configured to be located between the flange 15 of the adaptor 8, the flange insert 19 of the first flange 12 and the inner ring 36 of the anchor flange 18. The seat 39 in the flange insert 19 preferably comprises an inclined surface such that the gasket 38 is pressed towards the flange 15 of the adaptor 8 as well as towards the inner ring 36 of the anchor flange 18.

Figure 11:
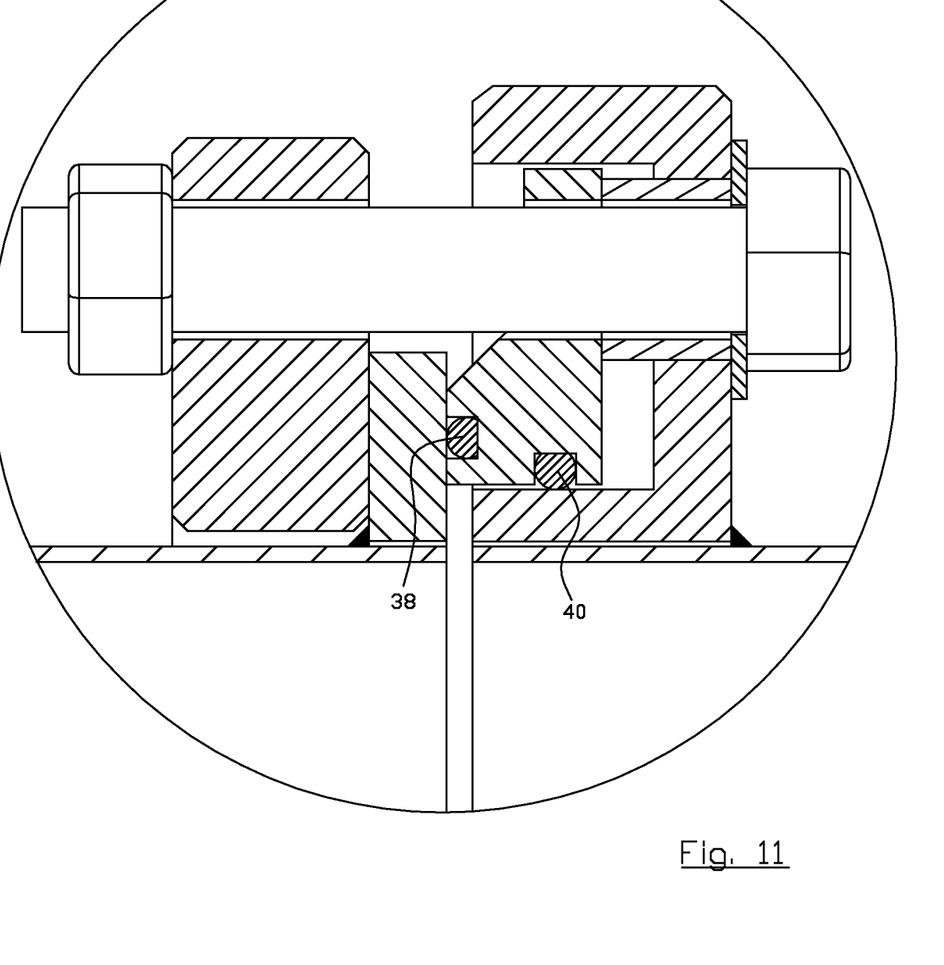

Reference is now also made to FIG. 11, which disclose an alternative sealing of the interface between the pipe connector 1 and the adaptor 8. The disclosed sealing comprises two circumferential gaskets, the first gasket 38 that is located between the flange 15 of the adaptor 8 and the flange insert 19 of the first flange 12, and a second gasket 40 that is located between the flange insert 19 and the inner ring 36 of the anchor flange 18. In an alternative embodiment the interface between the flange insert 19 and the inner ring 36 of the anchor flange 18 is a mechanical seal.

Feasible modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A pipe connector for connecting a first element to a second element, said pipe connector comprising
   a pipe segment having a first end and a second end,
   a first flange located at the first end of the pipe segment and configured to be connected to the first element,
   a second flange located at the second end of the pipe segment and configured to be connected to the second element,
   wherein said first flange comprises:
   (a) a circumferential anchor flange that is fixedly connected to the pipe segment at said first end of the pipe segment,
   (b) a flange insert that is displaceable in an axial direction of the pipe connector in relation to the anchor flange between a retracted position and an extended position, and
   (c) means for displacing the flange insert in relation to the anchor flange, in a direction running axially from the second end towards the first end of the pipe segment,
   wherein, in the extended position, the flange insert protrudes in the axial direction in relation to said anchor flange, and
   wherein, in the retracted position, the flange insert does not protrude in the axial direction in relation to said anchor flange.

2. The pipe connector according to claim 1, wherein the first flange further comprises at least one circumferential gasket, which is configured to be located between the first element and the flange insert.

3. The pipe connector according to claim 2, wherein said at least one gasket is located in a seat in the flange insert.

4. The pipe connector according to claim 2, wherein said at least one gasket is configured to be located between the first element, the flange insert and the anchor flange.

5. The pipe connector according to claim 1, wherein the flange insert is circumferential.

6. The pipe connector according to claim 1, wherein the anchor flange comprises an outer ring, an inner ring and a radially extending web connecting the outer ring and the inner ring, the flange insert located between the outer ring and the inner ring.

7. The pipe connector according to claim 1, wherein an outer diameter of the pipe segment is equal to or more than 300 mm.

8. The pipe connector according to claim 1, wherein the anchor flange protrudes in the axial direction in relation to said pipe segment.

9. The pipe connector according to claim 1, wherein the second flange is fixedly connected to the pipe segment at said second end.

10. The pipe connector according to claim 1, wherein the means for displacing the flange insert comprises at least three individual pushers.

11. The pipe connector according to claim 10, wherein each pusher comprises a screw that is in threaded engagement with the anchor flange, wherein said screw is configured to displace the flange insert when tightened.

12. The pipe connector according to claim 1, wherein the first flange comprises at least one safety member, which is configured to limit the axial displacement of the flange insert in relation to the anchor flange.

13. A pipe connector unit for connecting the second element to a pipe system, wherein the pipe connector unit comprises the pipe connector according to claim 1, and an adaptor, wherein the adaptor comprises:
   an adaptor pipe segment having a first end configured to be connected to said pipe system and a second end opposite the first end, and
   an adaptor flange located at the second end of the adaptor pipe segment and connected to the first flange of the pipe connector.

14. The pipe connector unit according to claim 13, wherein the adaptor flange comprises a circumferential flange ring that is fixedly connected to the second end of the adaptor pipe segment, and a circumferential loose flange that is threaded onto the adaptor pipe segment.

15. The pipe connector unit according to claim 13, wherein the flange insert of the first flange of the pipe connector abuts the adaptor flange when said flange insert is in the extended position.

16. The pipe connector unit according to claim 13, wherein the pipe connector unit comprises means for clamping the anchor flange of the first flange of the pipe connector and the adaptor flange.

* * * * *